United States Patent Office 3,251,883
Patented May 17, 1966

3,251,883
PROCESS FOR PREPARING 2-HYDROXYALKYL-PHOSPHINES AND 2-HYDROXYALKYLPHOS-PHONIUM SALTS
Michael M. Rauhut, Norwalk, and Andrew M. Semsel, Stamford, Conn., assignors to American Cyanamid Company, Stamford, Conn., a corporation of Maine
No Drawing. Filed July 20, 1962, Ser. No. 211,412
11 Claims. (Cl. 260—606.5)

The present invention relates to organophosphorus compounds and to the preparation of same. More particularly, the present invention relates to 2-hydroxyalkyl-phosphines and 2-hydroxyalkylphosphonium salts.

Pursuant to the instant discovery elemental phosphorus is brought into reactive contact, in the presence of an inert organic solvent, such as an ether, with an organometallic compound of the formula RM wherein R is alkyl having from 1 to 12 carbon atoms, cycloalkyl, aryl and substituted aryl, typical substituents for aryl being halogen, lower alkoxy, trifluoromethyl, and the like. M represents Li, Na or MgX where X is Cl, Br or I. The organometallic solution is conveniently prepared in the conventional way from the metal and the corresponding aryl alkyl or cycloalkyl halide. Of course, when M is sodium or lithium the organometallic solution also contains the corresponding metal halide (X), which is the source of halide ion found in the phosphonium salt products. For instance, see Examples I, II, VI, etc., infra.

The product resulting from the reaction of elemental phosphorus and the organometallic compound is, in turn, brought into reactive contact with an oxide of the formula

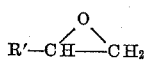

in which R′ represents hydrogen, alkyl having from 1 to 12 carbon atoms and phenyl, and the product from this reaction is hydrolyzed using water alone or, preferably, a dilute aqueous acid. The corresponding 2-hydroxy-alkylphosphonium salt and 2-hydroxyalkylphosphine result, the latter generally being characterized and isolated, as will be seen hereinafter, by further reaction with, say, an alkyl bromide or iodide to obtain the corresponding phosphonium salt.

The following equation best illustrates the reaction and reaction products contemplated herein:

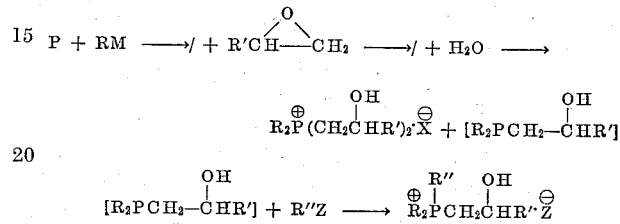

R″Z stands for lower alkyl bromide, lower alkyl iodide, allyl chloride, allyl bromide, benzyl chloride benzyl bromide, R″ representing the organic moiety and Z representing the halogen moiety.

Each of the four reaction steps in the above equation is best carried out at a temperature in the range of 0° C. to 150° C., preferably 5° C. to 75° C.

Typical substituted or unsubstituted, mono- and di-nuclear aryl lithium, magnesium and sodium compounds, substituted or unsubstituted, alkyl ($C_1$–$C_{12}$) lithium, magnesium, and sodium compounds, and cycloalkyl lithium, magnesium and sodium compounds within the purview of the instant invention are: n-butyllithium, n-butylmagnesium bromide, n-butylmagnesium chloride, methylmagnesium iodide, pentyl sodium, methylmagnesium chloride, 1-naphthyllithium, 3-(trifluoromethyl)phenyllithium, 4-fluorophenyllithium, 4-methoxyphenyllithium, octylmagnesium bromide, heptyllithium, hexylmagnesium bromide, cyclohexyllithium, n-dodecyllithium, heptafluoropropyl-lithium, 6 - methoxy - 2-naphthyllithium, n - propyllithium, 4-tolyllithium, 4-chlorophenyllithium, and the like.

Obviously, from the above list of organometallic compounds, the metallic moiety may or may not be halogenated. Likewise, the organic moiety may or may not be substituted. Typical substituents for the organic moiety are those which under the conditions of the reaction contemplated herein are inert: halogen, such as fluorine and the like, lower alkoxy, such as methoxy, ethoxy, propoxy and butoxy, and like substituents.

The elemental phosphorus reactant may be employed, as indicated hereinabove, as a finely-divided white phosphorus. However, elemental phosphorus in a different physical state, such as molten phosphorus or phosphorus in the form of "chunks," or other similar fractions, may be employed.

The reactants in the first two reaction steps, above, are best brought together in the presence of an inert organic solvent, i.e., a solvent which under the conditions of the reaction described herein does not react to any substantial degree with the reactants. Typical inert solvents are ethers, aromatic hydrocarbons, and the like, such as the following: tetrahydrofuran, diethylether, benzene, toluene, xylene, dimethoxyethane, diethylether of diethyleneglycol, dioxane. In addition, aliphatic and cycloaliphatic hydrocarbons are suitable solvents, such as pentane, decane, cyclohexane, etc.

The reaction step involving R″Z is likewise generally carried out in the presence of inert organic solvents of the type just given for steps one and two.

As to the ratio of reactants generally employed, at least 0.5:1, organometallic reactant to phosphorus atom, is employed; preferably a ratio of about 1:1 up to about 3:1 is used.

Hydrolysis of the reaction mixture resulting from the second step of the process contemplated herein is carried out by conventional means using water, acetic acid or dilute mineral acid, such as dilute HCl, $H_2SO_4$, etc.

The amount of oxide reactant introduced into the second of the above process steps is not critical. Preferably, however, an equimolar amount of oxide, such as propylene oxide, based upon the amount of organometallic reactant (of the first step), is generally employed. Substantially more or substantially less than an equimolar amount may be employed, however, without altering the nature of the reaction. This applies to the hydrolysis step as well as to the ratio of R″Z reactant to organometallic reactant. In this later case, an equimolar amount of R″Z reactant, based upon the amount of organometallic reactant, represents an excess of said R″Z reactant over the intermediate

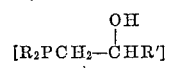

The process of the present invention, including each reaction step, may be carried out at atmospheric, sub-atmospheric, or super-atmospheric pressure. Batch, continuous or semi-continuous conditions may be employed.

The present invention will best be understood from the following typical examples:

EXAMPLE I

*Diphenylbis(2-hydroxypropyl)phosphonium bromide Methyldiphenyl-2-hydroxypropylphosphonium iodide*

White phosphorus (15.5 grams, 0.5 gram atom) is combined with a solution of 1 mole of phenyllithium in 700 milliliters of ether under nitrogen. The mixture is stirred at reflux for 3 hours and allowed to cool to room temperature. A solution of 58.1 grams (1.0 mole) of propylene oxide in 50 milliliters of ether is added dropwise during 45 minutes at 25° C.–30° C. The reaction is strongly exothermic and requires cooling. The color changes sharply from dark red to pale yellow at the end of the addition. The reaction mixture is stirred an additional 30 minutes and then treated dropwise with 66.0 grams (1.1 moles) of glacial acetic acid, followed by the addition of 400 milliliters of water. The mixture is filtered to obtain 28.2 grams (15%) of diphenylbis(2-hydroxypropyl)phosphonium bromide, melting point 183° C.–187° C. The solid is washed with hot chloroform and recrystallized twice from isopropyl alcohol to obtain an analytical sample, melting point 197° C.–200° C.

*Analysis.*—Calculated for $C_{18}H_{24}BrO_2P$: C, 56.41; H, 6.31; Br, 20.85; P, 8.08. Found: C, 56.45; H, 6.46; Br, 20.81; P, 8.24

The two liquid phases present in the filtered reaction mixture are separated, and the organic (ether) phase is dried over anhydrous sodium sulfate Concentration of the aqueous phase gives an additional 6.9 grams (4%) of diphenylbis(2-hydroxypropyl)phosphonium bromide, melting point 191° C.–194° C.

The dried organic (ether) phase is combined with 85.2 grams (0.6 mole) of methyl iodide, and the solution is refluxed for 90 minutes. An insoluble oil separates. The ether phase is decanted, and the oil is stirred with 100 milliliters of isopropyl alcohol. The oil crystallizes, and the resulting solid is collected to obtain 35.9 grams (19%) of methydiphenyl-2-hydroxypropylphosphonium iodide, melting point 159° C.–162° C. Two recrystallizations from isopropyl alcohal give an analytical sample, melting point 163° C.–164° C.

*Analysis.*—Calculated for $C_{16}H_{20}IOP$: C, 49.75; H, 5.21; I, 32.86; P, 8.02. Found: C, 49.53; H, 5.16; I, 32.74; P, 8.14.

The phenyllithium reactant hereinabove is prepared in the conventional way from 1.0 mole of bromobenzene and 1 gram atom of lithium metal. The by-product lithium bromide from this preparation is the source of the bromide ion found in the diphenylbis-(2-hydroxypropyl)-phosphonium bromide.

EXAMPLES II–XXVII

The following table contains examples carried out essentially as in Example I, except as shown:

3,251,883

TABLE I

| Example No. | P+RM | Temp. °C. | Molar Ratio RM:P | Solvent | $+R'CH\overset{O}{\underset{\diagdown}{-}}CH_2\rightarrow$ [O=oxide] | Temp. °C. | Molar Ratio $R'CH\overset{O}{\underset{\diagdown}{-}}CH_2:RM$ | $+H_2O\rightarrow R_2P\overset{\oplus}{(}CH_2\overset{OH}{\underset{|}{C}}HR')_2\cdot X^{\ominus}$ | $+[R_2PCH_2\overset{OH}{\underset{|}{-}}CHR']$ |
|---|---|---|---|---|---|---|---|---|---|
| II | P n-butyllithium | 0 | 2:1 | Et₂O¹ | Ethylene O | | 1:1 | Dibutylbis(2-hydroxyethyl)-phosphonium bromide.³ | Dibutyl-2-hydroxyethylphosphine. |
| III | P n-butylmagnesium bromide | 65 | 1.5:1 | THF² | Propylene O | | 1:1 | Dibutylbis(2-hydroxypropyl)phosphonium bromide. | Dibutyl-2-hydroxypropylphosphine. |
| IV | P n-butylmagnesium chloride | 60 | 2:1 | Et₂O | 1-butylene O | | 1:1 | Dibutylbis(2-hydroxybutyl)phosphonium chloride. | Dibutyl-2-hydroxybutylphosphine. |
| V | P methylmagnesium iodide | 0 | 0.5:1 | Et₂O | Styrene oxide | | 1:1 | Dimethylbis(2-hydroxy-2-phenylethyl)-phosphonium iodide. | Dimethyl-2-hydroxy-2-phenylethylphosphine. |
| VI | P pentylsodium | 0 | 1.5:1 | Pentane | do | | 1.5:1 | Dipentylbis(2-hydroxy-2-phenylethyl)-phosphonium chloride. | Dipentyl-2-hydroxy-2-phenylethylphosphine. |
| VII | P decylsodium | 0 | 1.5:1 | Dodecane | Ethylene O | | 1:1 | Didodecylbis(2-hydroxyethyl)phosphonium chloride. | Didodecyl-2-hydroxyethylphosphine. |
| VIII | P 1-naphthyllithium | 35 | 2:1 | Et₂O | Propylene O | | 0.8:1 | Di-1-naphthylbis(2-hydroxypropyl)-phosphonium bromide. | Dinaphthyl-2-hydroxypropylphosphine. |
| IX | P 3-(trifluoromethyl)phenyllithium | 35 | 2:1 | Et₂O | do | | 1:1 | Bis[3-(trifluoromethyl)phenyl]bis(2-hydroxypropyl)phosphonium bromide. | Bis[3-(trifluoromethyl)phenyl]-2-hydroxypropylphosphine. |
| X | P 4-fluorophenyllithium | 35 | 1.5:1 | Et₂O | do | | 1:1 | Bis(4-fluorophenyl)bis(2-hydroxypropyl)phosphonium bromide. | Bis(4-fluorophenyl)-2-hydroxypropylphosphine. |
| XI | P 4-methoxyphenyllithium | 35 | 1.5:1 | Et₂O | do | | 1:1 | Bis(4-methoxyphenyl)bis(2-hydroxypropyl)phosphonium bromide. | Bis(4-methoxyphenyl)-2-hydroxypropylphosphine. |
| XII | P octylmagnesium chloride | 35 | 1.5:1 | Et₂O | do | | 1:1 | Dioctylbis(2-hydroxypropyl)phosphonium chloride. | Dioctyl-2-hydroxypropylphosphine. |
| XIII | P heptyllithium | 0 | 1.5:1 | Heptane | do | | 1:1 | Diheptylbis(2-hydroxypropyl)phosphonium chloride. | Diheptyl-2-hydroxypropylphosphine. |
| XIV | P hexylmagnesium bromide | 35 | 1.5:1 | Et₂O | do | | 1:1 | Dihexylbis(2-hydroxypropyl)phosphonium bromide. | Dihexyl-2-hydroxypropylphosphine. |
| XV | P cyclohexyllithium | 0 | 1.5:1 | Et₂O | do | | 1:1 | Dicyclohexyl-bis(2-hydroxypropyl)phosphonium bromide. | Dicyclohexyl-2-hydroxypropylphosphine. |
| XVI | P n-dodecyllithium | 0 | 1.5:1 | Et₂O | do | | 1:1 | Didocyl-bis(2-hydroxypropyl)phosphonium bromide. | Didocyl-2-hydroxypropylphosphine. |
| XVII | P heptafluoropropyllithium | 0 | 1.5:1 | Et₂O | do | | 1:1 | Bis(heptafluoropropyl)bis-(2-hydroxypropyl)phosphonium bromide. | Diheptafluoropropyl-2-hydroxypropylphosphine. |
| XVIII | P 6-methoxy-2-naphthyllithium | 35 | 1.5:1 | Et₂O | do | | 1:1 | Bis(6-methoxy-2-naphthyl)bis-(2-hydroxypropyl)phosphonium bromide. | Bis(6-methoxy-2-naphthyl)-2-hydroxypropylphosphine. |
| XIX | P n-propyllithium | 0 | 1.5:1 | Et₂O | do | | 1:1 | Dipropylbis(2-hydroxypropyl)-phosphonium bromide. | Dipropyl-2-hydroxypropylphosphine. |
| XX | P 4-tolyllithium | 35 | 1.6:1 | Et₂O | do | | 1:1 | Bis(4-tolyl)bis(2-hydroxypropyl)-phosphonium chloride. | Bis(4-tolyl)-2-hydroxypropylphosphine. |
| XXI | P 4-chlorophenyllithium | 0 | 1.5:1 | Et₂O | do | | 1:1 | Bis(4-chlorophenyl)bis(2-hydroxypropyl)phosphonium bromide. | Bis(4-chlorophenyl)-2-hydroxypropylphosphine. |
| XXII | P phenylsodium | 0 | 2:1 | Toluene | do | | 1:1 | Diphenylbis(2-hydroxypropyl)phosphonium chloride. | Diphenyl-2-hydroxypropylphosphine. |
| XXIII | P 2-(trichloromethyl)phenyl-magnesium bromide | 35 | 2:1 | Et₂O | do | | 1:1 | Bis[2-(trichloromethyl)phenyl]bis(2-hydroxypropyl)phosphonium bromide. | Bis [2-(trichloromethyl)phenyl]-2-hydroxypropylphosphine. |
| XXIV | P cyclopentylsodium | 0 | 1.5:1 | Cyclopentane | do | | 1:1 | Dicyclopentyl-bis-(2-hydroxypropyl)-phosphonium chloride. | Dicyclopentyl-2-hydroxypropylphosphine. |
| XXV | P 4-tolylmagnesium iodide | 5 | 1.5:1 | Et₂O | do | | 1:1 | Bis(4-tolyl) bis (2-hydroxypropyl)-phosphonium iodide. | Bis(4-tolyl)-2-hydroxypropylphosphine. |
| XXVI | P phenyllithium | 35 | 1.5:1 | Et₂O | 1-dodecene-oxide | | 1:1 | Diphenylbis[1-(2-hydroxy)dodecyl]-phosphonium bromide. | Diphenyl-1-(2-hydroxy)dodecylphosphine. |
| XXVII | P 3-ethylphenylmagnesium chloride | 65 | 1.5:1 | THF | Ethylene O | | 1:1 | Bis(3-ethylphenyl)bis(2-hydroxyethyl)-phosphonium chloride. | Bis(3-ethylphenyl)-2-hydroxyethylphosphine. |

See footnotes at end of table.

TABLE I.—Continued

| Example No. | $[R_2PCH_2\overset{\underset{\mid}{OH}}{C}HR']$ | +R"Z' | Temp. °C | Molar Ratio R"Z':P | $\overset{\oplus}{R_2P}CH\overset{\underset{\mid}{R''}}{\phantom{C}}\overset{\underset{\mid}{OH}}{C}HR'\cdot \overset{\ominus}{Z}$ |
|---|---|---|---|---|---|
| II | Dibutyl-2-hydroxyethylphosphine | Methyl iodide | | 0.5:1 | Dibutylmethyl-2-hydroxyethylphosphonium iodide. |
| III | Dibutyl-2-hydroxypropylphosphine | Ethyl bromide | | 0.3:1 | Dibutylethyl-2-hydroxypropylphosphonium bromide. |
| IV | Dibutyl-2-hydroxybutylphosphine | Methyl iodide | | 1:1 | Dibutylpropyl-2-hydroxybutylphosphonium iodide. |
| V | Dimethyl-2-hydroxy-2-phenylethylphosphine | ----do---- | | 0.7:1 | Trimethyl-2-hydroxy-2-phenylethylphosphonium iodide. |
| VI | Dipentyl-2-hydroxy-2-phenylethylphosphine | Allyl chloride | | 1:1 | Allyldipentyl-2-hydroxy-2-phenylethylphosphonium bromide. |
| VII | Didodecyl-2-hydroxyethylphosphine | Methyl iodide | | 1:1 | Didodecylmethyl-2-hydroxyethylphosphonium iodide. |
| VIII | Di-1-naphthyl-2-hydroxypropylphosphine | ----do---- | | 0.4:1 | Di-1-naphthylmethyl-2-hydroxypropylphosphonium iodide. |
| IX | Bis[3-(trifluoromethyl)phenyl]-2-hydroxypropylphosphine | Propyl bromide | | 1:1 | Bis[3-(trifluoromethyl)phenyl]-propyl-2-hydroxypropylphosphonium bromide. |
| X | Bis(4-fluorophenyl)-2-hydroxypropylphosphine | Ethyl bromide | | 1:1 | Bis(4-fluorophenyl)ethyl-2-hydroxypropylphosphonium bromide. |
| XI | Bis(4-methoxyphenyl)-2-hydroxypropylphosphine | 2,4-dichlorobenzyl bromide | | 1:1 | Bis(4-methoxyphenyl)2,4-dichlorobenzyl-2-hydroxypropylphosphonium bromide. |
| XII | Dioctyl-2-hydroxypropylphosphine | Benzyl chloride | | 0.6:1 | Benzyldioctyl-2-hydroxypropylphosphonium bromide. |
| XIII | Diheptyl-2-hydroxypropylphosphine | ----do---- | | 0.9:1 | Benzyldiheptyl-2-hydroxypropylphosphonium chloride. |
| XIV | Dihexyl-2-hydroxypropylphosphine | Ethyl iodide | | 1:1 | Dihexylethyl-2-hydroxypropylphosphonium iodide. |
| XV | Dicyclohexyl-2-hydroxypropylphosphine | Methyl bromide | | 1:1 | Dicyclohexylmethyl-2-hydroxypropylphosphonium bromide. |
| XVI | Didodecyl-2-hydroxypropylphosphine | Methyl iodide | | 1:1 | Didodecylmethyl-2-hydroxypropylphosphonium iodide. |
| XVII | Diheptafluoropropyl-2-hydroxypropylphosphine | ----do---- | | 1:1 | Diheptafluoropropylmethyl-2-hydroxypropylphosphonium iodide. |
| XVIII | Bis(6-methoxy-2-naphthyl)-2-hydroxypropylphosphine | ----do---- | | 1:1 | Bis(6-methoxy-2-naphthyl)methyl-2-hydroxypropylphosphonium iodide. |
| XIX | Dipropyl-2-hydroxypropylphosphine | Allyl bromide | | 1:1 | Dipropyl-2-hydroxypropylphosphonium iodide. |
| XX | Bis(4-tolyl)-2-hydroxypropylphosphine | Methyl iodide | | 0.5:1 | Bis(4-tolyl)methyl-2-hydroxypropylphosphonium iodide. |
| XXI | Bis(4-chlorophenyl)-2-hydroxypropylphosphine | Butyl bromide | | 1:1 | Bis(4-chlorophenyl)butyl-2-hydroxypropylphosphonium bromide. |
| XXII | Diphenyl-2-hydroxypropylphosphine | Ethyl iodide | | 0.7:1 | Diphenylethyl-2-hydroxypropylphosphonium iodide. |
| XXIII | Bis[2-(trifluoromethyl)phenyl]-2-hydroxypropylphosphine | Methyl iodide | | 1:1 | Bis[2-(trifluoromethyl)phenyl]methyl-2-hydroxypropylphosphonium iodide. |
| XXIV | Dicyclopentyl-2-hydroxypropylphosphine | Propyl iodide | | 1:1 | Dicyclopentylpropyl-2-hydroxypropylphosphonium iodide. |
| XXV | Bis(4-tolyl)-2-hydroxypropylphosphine | Methyl iodide | | 0.3:1 | Bis(4-tolyl)methyl-2-hydroxypropylphosphonium iodide. |
| XXVI | Diphenyl-1-(2-hydroxy)dodecylphosphine | ----do---- | | 1:1 | Diphenylmethyl-1-(2-hydroxydodecyl)-phosphonium iodide. |
| XXVII | Bis(3-ethylphenyl)-2-hydroxyethylphosphine | ----do---- | | 1:1 | Bis(3-ethylphenyl)methyl-2-hydroxyethylphosphonium iodide. |

[1] Diethylether.
[2] Tetrahydrofuran.
[3] As in Example I, supra, the halide ions in this column originate from the inorganic halide byproduct realized upon the preparation of RM where M is Li or Na.

The phosphonium salts of the present invention represented by the formulae

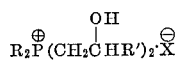

and

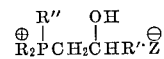

have direct utility as flame retardants on cotton cloth. For example, a small but effective amount of the product of Example I, above, diphenylbis(2-hydroxypropyl)phosphonium bromide or methyldiphenyl-2-hydroxypropylphosphonium iodide, may be dissolved in a suitable solvent, such as isopropyl alcohol (heating the alcohol enhances solubility), cotton cloth dipped into the resulting solution and then dried. The phosphonium salt acts as a flame retardant on the cotton cloth.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A 2-hydroxyalkylphosphonium salt of the formula

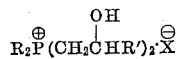

wherein R represents a member selected from the group consisting of alkyl having from 1 to 12 carbon atoms, cycloalkyl, aryl, and substituted aryl, said substituents for aryl being selected from the group consisting of halogen, lower alkoxy, and trifluoromethyl; R' represents a member selected from the group consisting of hydrogen, alkyl having from 1 to 12 carbon atoms and phenyl; and X represents a member selected from the group consisting of Cl, Br and I.

2. Diphenylbis(2-hydroxypropyl)phosphonium bromide.
3. Dibutylbis(2-hydroxybutyl)phosphonium chloride.
4. Dimethylbis(2-hydroxy-2-phenylethyl)phosphonium iodide.
5. Bis[3-(trifluoromethyl)phenyl]bis(2-hydroxypropyl)phosphonium bromide.
6. A method which comprises bringing into reactive contact, in the presence of an inert organic solvent, elemental phosphorus and an organometallic compound of the formula RM in the presence of a halide ion $X^{\ominus}$ selected from the group consisting of Cl, Br, and I, reacting the resulting reaction product mixture with an oxide of the formula

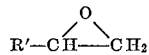

and hydrolyzing the product which results, thus producing the corresponding 2-hydroxyalkylphosphonium salt of the formula

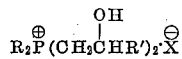

wherein R represents a member selected from the group consisting of alkyl having from 1 to 12 carbon atoms, cycloalkyl, aryl and substituted aryl, said substituents for aryl being selected from the group consisting of halogen, lower alkoxy and trifluoromethyl; R' represents a member selected from the group consisting of hydrogen, alkyl having from 1 to 12 carbon atoms and phenyl; and M is selected from the group consisting of Li, Na and MgX, X being the same as above.

7. A method according to claim 6 wherein the product mixture resulting from hydrolysis is reacted with an organic halide of the formula R''Z, wherein R'' represents the organic moiety of a member selected from the group consisting of lower alkyl bromide, lower alkyl iodide, allyl chloride, allyl bromide, benzyl chloride, and benzyl bromide, and Z represents the halogen moiety, and recovering the corresponding 2-hydroxyalkylphosphonium salt of the formula

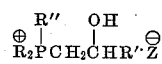

wherein R'' and Z have the meaning given above.

8. A method according to claim 6 wherein the 2-hydroxyalkylphosphonium salt of the formula

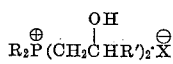

is recovered from the product mixture and the remaining product is reacted with an alkyl halide of the formula R''Z, wherein R'' represents the organic moiety of a member selected from the group consisting of lower alkyl bromide, lower alkyl iodide, allyl chloride, allyl bromide, benzyl chloride, and benzyl bromide, and Z represents the halogen moiety, and recovering the corresponding 2-hydroxyalkylphosphonium salt of the formula

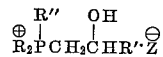

wherein R'' and Z have the meaning given above.

9. A method which comprises bringing into reactive contact, in the presence of an inert organic solvent, elemental phosphorus and phenyllithium in the presence of a bromide ion, reacting the resulting reaction product mixture with propylene oxide and hydrolyzing the product obtained in this last reaction, thus producing diphenylbis(2-hydroxypropyl)phosphonium bromide.

10. The process according to claim 9 wherein the product remaining upon removal of diphenylbis(2-hydroxypropyl)phosphonium bromide is reacted with methyl iodide and methyl diphenyl-2-hydroxypropylphosphonium iodide is produced.

11. The method according to claim 9 wherein the product mixture upon hydrolysis is reacted with methyl iodide and the product of this reaction, methyl diphenyl-2-hydroxypropylphosphonium iodide is recovered.

No references cited.

TOBIAS E. LEVOW, *Primary Examiner.*

OSCAR R. VERTIZ, *Examiner.*

L. A. SEBASTIAN, *Assistant Examiner.*